US012781503B2

(12) United States Patent
Stav et al.

(10) Patent No.: US 12,781,503 B2
(45) Date of Patent: Nov. 3, 2026

(54) METHOD OF MANUFACTURING GYPSUM BOARD WITH IMPROVED FIRE RESISTANCE

(71) Applicant: Gold Bond Building Products, LLC, Charlotte, NC (US)

(72) Inventors: Eli Stav, Chrlotte, NC (US); Jie Ling, Irmo, SC (US); Brad Busche, Shelby, NC (US); Joseph J. Bailey, Charlotte, NC (US); R. G. Iyer, Fort Mill, SC (US); Veda Evans, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

(21) Appl. No.: 18/670,937

(22) Filed: May 22, 2024

(65) Prior Publication Data

US 2024/0309639 A1 Sep. 19, 2024

Related U.S. Application Data

(63) Continuation of application No. 17/750,548, filed on May 23, 2022, now Pat. No. 12,031,328, which is a continuation of application No. 15/877,993, filed on Jan. 23, 2018, now Pat. No. 11,339,572.

(60) Provisional application No. 62/449,484, filed on Jan. 23, 2017.

(51) Int. Cl.

| | |
|---|---|
| ***E04C 2/04*** | (2006.01) |
| ***C04B 14/06*** | (2006.01) |
| ***C04B 22/10*** | (2006.01) |
| ***C04B 22/12*** | (2006.01) |
| ***C04B 22/14*** | (2006.01) |
| ***C04B 22/16*** | (2006.01) |
| ***C04B 28/16*** | (2006.01) |
| ***C04B 111/00*** | (2006.01) |
| ***C04B 111/28*** | (2006.01) |

(52) U.S. Cl.

CPC ............ *E04C 2/043* (2013.01); *C04B 14/062* (2013.01); *C04B 14/066* (2013.01); *C04B 22/10* (2013.01); *C04B 22/12* (2013.01); *C04B 22/124* (2013.01); *C04B 22/142* (2013.01); *C04B 22/149* (2013.01); *C04B 22/16* (2013.01); *C04B 28/165* (2013.01); *C04B 2111/0062* (2013.01); *C04B 2111/28* (2013.01)

(58) Field of Classification Search

None

See application file for complete search history.

(56) References Cited

U.S. PATENT DOCUMENTS

| | | | |
|---|---|---|---|
| 2,526,066 | A | 10/1950 | Croce |
| 2,853,394 | A | 9/1958 | Riddell et al. |
| 2,980,548 | A | 4/1961 | Lee |
| 3,454,456 | A | 7/1969 | Willey |
| 3,513,009 | A | 5/1970 | Sauer et al. |
| 3,616,173 | A | 10/1971 | Green et al. |
| 3,770,468 | A | 11/1973 | Knauf et al. |
| 4,214,027 | A | 7/1980 | Knauf et al. |
| 4,261,757 | A | 4/1981 | Mathieu |
| 4,278,468 | A | 7/1981 | Selbe et al. |
| 4,557,973 | A | 12/1985 | Ali |
| 4,630,419 | A | 12/1986 | Pilgrim |
| 4,647,486 | A | 3/1987 | Ali |
| 4,664,707 | A | 5/1987 | Wilson et al. |
| 4,722,866 | A | 2/1988 | Wilson et al. |
| 5,148,645 | A | 9/1992 | Lehnert et al. |
| 5,155,959 | A | 10/1992 | Richards et al. |
| 5,171,366 | A | 12/1992 | Richards et al. |
| 5,305,577 | A | 4/1994 | Richards et al. |
| 5,347,780 | A | 9/1994 | Richards et al. |
| 5,723,226 | A | 3/1998 | Francis et al. |
| 5,798,010 | A | 8/1998 | Richards et al. |
| 5,922,447 | A | 7/1999 | Baig |
| 5,945,182 | A | 8/1999 | Fowler et al. |
| 5,945,208 | A | 8/1999 | Richards et al. |
| 6,221,521 | B1 | 4/2001 | Lynn et al. |
| 6,268,042 | B1 | 7/2001 | Baig |
| 6,299,970 | B1 | 10/2001 | Richards et al. |
| 6,340,389 | B1 | 1/2002 | Klus |
| 6,342,284 | B1 | 1/2002 | Yu et al. |
| 6,569,541 | B1 | 5/2003 | Martin et al. |
| 6,620,487 | B1 | 9/2003 | Tonyan et al. |
| 6,632,550 | B1 | 10/2003 | Yu et al. |

(Continued)

FOREIGN PATENT DOCUMENTS

| | | | | | |
|---|---|---|---|---|---|
| CN | 101012119 | A | * | 8/2007 | ............. C04B 28/14 |
| CN | 101348338 | | | 1/2009 | |
| CN | 104724966 | | | 6/2015 | |
| GB | 2336360 | | | 10/1999 | |
| JP | 2001354468 | A | * | 12/2001 | ........... C04B 20/107 |
| KR | 20060064350 | | | 6/2006 | |
| WO | WO1999064690 | | | 12/1999 | |
| WO | WO2000006849 | | | 2/2000 | |
| WO | WO2010067210 | | | 6/2010 | |
| WO | WO2014091276 | | | 6/2014 | |
| WO | WO2014154597 | | | 10/2014 | |
| WO | WO2014187703 | | | 11/2014 | |

(Continued)

OTHER PUBLICATIONS

Ferric Chloride anhydrous definition in Hawley's Condensed Chemical Dictionary. (Year: 2007).*

(Continued)

*Primary Examiner* — David Sample

(74) *Attorney, Agent, or Firm* — Dority & Manning, P.A.

(57) ABSTRACT

The present disclosure is directed to a method of manufacturing gypsum board as well as the resulting gypsum board. The method comprises providing a gypsum slurry with a shrinkage-reducing additive comprising a metal salt of an acid, a silica, or a mixture thereof. As a result, the gypsum board includes gypsum and a shrinkage-reducing additive comprising a metal salt of an acid, a silica, or a mixture thereof. The gypsum board exhibits an area shrinkage of less than 20%.

19 Claims, 6 Drawing Sheets

(56) References Cited

U.S. PATENT DOCUMENTS 6,800,131 B2 10/2004 Yu et al.
6,846,358 B2 1/2005 Francis
6,875,503 B1 4/2005 Famy et al.
7,244,304 B2 7/2007 Yu et al.
7,381,261 B1 6/2008 Nelson
7,410,688 B2 8/2008 Baig
7,425,236 B2 9/2008 Yu et al.
7,513,963 B2 4/2009 Frank et al.
7,544,242 B2 6/2009 Liu et al.
7,700,505 B2 4/2010 Leclercq et al.
7,732,032 B2 6/2010 Dubey
7,758,980 B2 7/2010 Yu et al.
7,776,170 B2 8/2010 Yu et al.
7,841,148 B2 11/2010 Tonyan et al.
7,845,130 B2 12/2010 Tonyan et al.
7,849,648 B2 12/2010 Tonyan et al.
7,849,649 B2 12/2010 Tonyan et al.
7,849,650 B2 12/2010 Tonyan et al.
7,870,698 B2 1/2011 Tonyan et al.
7,964,034 B2 6/2011 Yu et al.
8,038,790 B1 10/2011 Dubey et al.
8,061,108 B2 11/2011 Tonyan et al.
8,061,257 B2 11/2011 Tonyan et al.
8,065,852 B2 11/2011 Tonyan et al.
8,065,853 B2 11/2011 Tonyan et al.
8,069,633 B2 12/2011 Tonyan et al.
8,070,878 B2 12/2011 Dubey
8,079,198 B2 12/2011 Tonyan et al.
8,088,217 B2 1/2012 Francis
8,122,679 B2 2/2012 Tonyan et al.
8,142,914 B2 3/2012 Yu et al.
8,163,352 B2 4/2012 Jones
8,221,542 B2 7/2012 Francis
8,298,332 B2 10/2012 Dubey
8,303,709 B2 11/2012 Yu et al.
8,323,785 B2 12/2012 Yu et al.
8,329,308 B2 12/2012 Liu et al.
8,366,823 B2 2/2013 Perez-Pena
8,466,224 B2 6/2013 Sebastien et al.
8,500,904 B2 8/2013 Yu et al.
8,519,016 B2 8/2013 Perez-Pena
8,551,241 B2 10/2013 Perez-Pena
8,673,201 B2 3/2014 Francis
8,702,881 B2 4/2014 Yu et al.
8,795,429 B2 8/2014 Perez-Pena
8,974,597 B2 3/2015 Yu et al.
8,974,925 B1 3/2015 Cao et al.
9,090,506 B2 7/2015 Perez-Pena
9,382,153 B2 7/2016 Fisher et al.
9,593,044 B2 3/2017 Moore et al.
9,623,586 B2 4/2017 Yu et al.
9,764,983 B2 9/2017 Chuda et al.
9,856,170 B2 1/2018 Chuda et al.
9,868,269 B2 1/2018 Chuda et al.
9,932,271 B2 4/2018 Teng et al.
9,938,192 B2 4/2018 Moore et al.
9,944,556 B2 4/2018 Lettkeman et al.
9,945,119 B2 4/2018 Aldabaibeh et al.
9,950,957 B2 4/2018 Xu et al.
9,963,391 B2 5/2018 Abolt et al.
9,975,808 B2 5/2018 Lettkeman et al.
10,040,725 B2 8/2018 Perez-Pena
10,052,680 B2 8/2018 Retot et al.
10,066,392 B2 9/2018 Miller et al.
10,245,755 B2 4/2019 Yu et al.
10,259,196 B2 4/2019 Francis
10,377,108 B2 8/2019 Chan et al.
11,339,572 B1 5/2022 Stav et al.
12,031,328 B2 * 7/2024 Stav ...................... C04B 22/149
2002/0045074 A1 4/2002 Yu et al.
2003/0044630 A1 3/2003 Leclercq
2003/0138614 A1 7/2003 Leclercq
2003/0175478 A1 9/2003 Leclercq
2006/0278128 A1 12/2006 Liu et al.
2010/0043344 A1 2/2010 Tada et al.
2010/0075166 A1 3/2010 Gilley et al.
2010/0075167 A1 3/2010 Gilley et al.
2011/0195241 A1 8/2011 Yu et al.
2013/0101838 A1 4/2013 Yu et al.
2014/0017532 A1 1/2014 Nishihara et al.
2015/0104629 A1 4/2015 Cao et al.
2015/0125683 A1 5/2015 Cao et al.
2015/0147546 A1 5/2015 Cao et al.
2015/0266270 A1 9/2015 Yu et al.
2015/0307397 A1 10/2015 Bouteiller et al.
2016/0208439 A1 7/2016 Lelogeay
2016/0258157 A1 9/2016 Yu et al.
2017/0096366 A1 4/2017 Vilinska et al.
2017/0096369 A1 4/2017 Vilinska et al.
2017/0129813 A1 5/2017 Yu et al.
2017/0152177 A1 6/2017 Vilinska et al.
2017/0190147 A1 7/2017 Brooks et al.
2017/0320779 A1 11/2017 Brooks et al.
2017/0327423 A1 11/2017 Brooks et al.
2017/0327424 A1 11/2017 Brooks et al.
2017/0334782 A1 11/2017 Brooks et al.
2017/0334783 A1 11/2017 Brooks et al.
2017/0362124 A1 12/2017 Sang et al.
2018/0080226 A1 3/2018 Lu et al.
2018/0099908 A1 4/2018 Emami et al.
2018/0119417 A1 5/2018 Li et al.
2018/0237341 A1 8/2018 Lettkeman et al.
2018/0346383 A1 * 12/2018 Bailey ...................... B01J 6/001
2018/0354856 A1 12/2018 Wieteska et al.
2018/0370855 A1 12/2018 Ironside et al.
2019/0055162 A1 2/2019 Mayers et al.
2019/0077711 A1 3/2019 Dion et al.
2019/0100463 A1 4/2019 Cherian et al.
2019/0248041 A1 8/2019 Yu et al.
2022/0282484 A1 9/2022 Stav et al.

FOREIGN PATENT DOCUMENTS

WO WO2015185143 12/2015
WO WO2015185251 12/2015
WO WO2016079099 5/2016
WO WO2017108146 6/2017
WO WO2017179844 10/2017

OTHER PUBLICATIONS

Ataman Chemicals, Colloidal Silica, 2015.
Hawley's Condensed Chemical Dictionary, "Calcium Sulfate" First published: Mar. 15, 2007.
Reade, Fumed Silica Powder (SiO2), 2013.
Xunyu Chemical, "Fumed silica and silica fume" 2011.
Yen, "6. Additives that reduce the tendency to shrink and crack," Gypsum building materials (second edition), China Building Materials Industry Press, 2012, pp. 283-285.

* cited by examiner

METHOD OF MANUFACTURING GYPSUM BOARD WITH IMPROVED FIRE RESISTANCE

RELATED APPLICATIONS

The present application a continuation of U.S. application Ser. No. 17/750,548 having a filing date of May 23, 2022, which is a continuation of U.S. application Ser. No. 15/877,993 having a filing date of Jan. 23, 2018, which claims the benefit of U.S. Provisional Application No. 62/449,484 having a filing date of Jan. 23, 2017, all of which are hereby incorporated in their entirety.

BACKGROUND OF THE INVENTION

Gypsum wallboards have been used as fire resistant building materials for many years. Generally, the fire resistance of the board is derived from the loss of crystalline water ("endothermic dehydration") present in the gypsum molecular structure. However, when exposed to high temperatures, gypsum boards have a tendency to shrink. Such shrinkage can also result in cracks or voids to form within the core. In turn, this can affect the mechanical integrity and strength of the board and also create openings that may allow fire or hot air to penetrate through the board and/or a wall assembly containing such board. This can result in increased heat transfer and ultimately, failure of the board and/or the wall assembly.

As a result, a need exists for providing a gypsum board with improved resistance. In particular, a need exists for providing a gypsum board with reduced shrinkage and improved mechanical strength, for instance when exposed to high temperatures.

SUMMARY OF THE INVENTION

Aspects and advantages of the invention will be set forth in part in the following description, or may be apparent from the description, or may be learned through practice of the invention.

In accordance with one embodiment of the present invention, a method for manufacturing a gypsum board is disclosed. The method comprises providing a gypsum slurry with a shrinkage-reducing additive comprising a metal salt of an acid, a silica, or a mixture thereof. The gypsum board exhibits an area shrinkage of less than 20%.

In accordance with another embodiment of the present invention, a gypsum board is disclosed. In particular the gypsum board includes gypsum and a shrinkage-reducing additive comprising a metal salt of an acid, a silica, or a mixture thereof. The gypsum board exhibits an area shrinkage of less than 20%.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
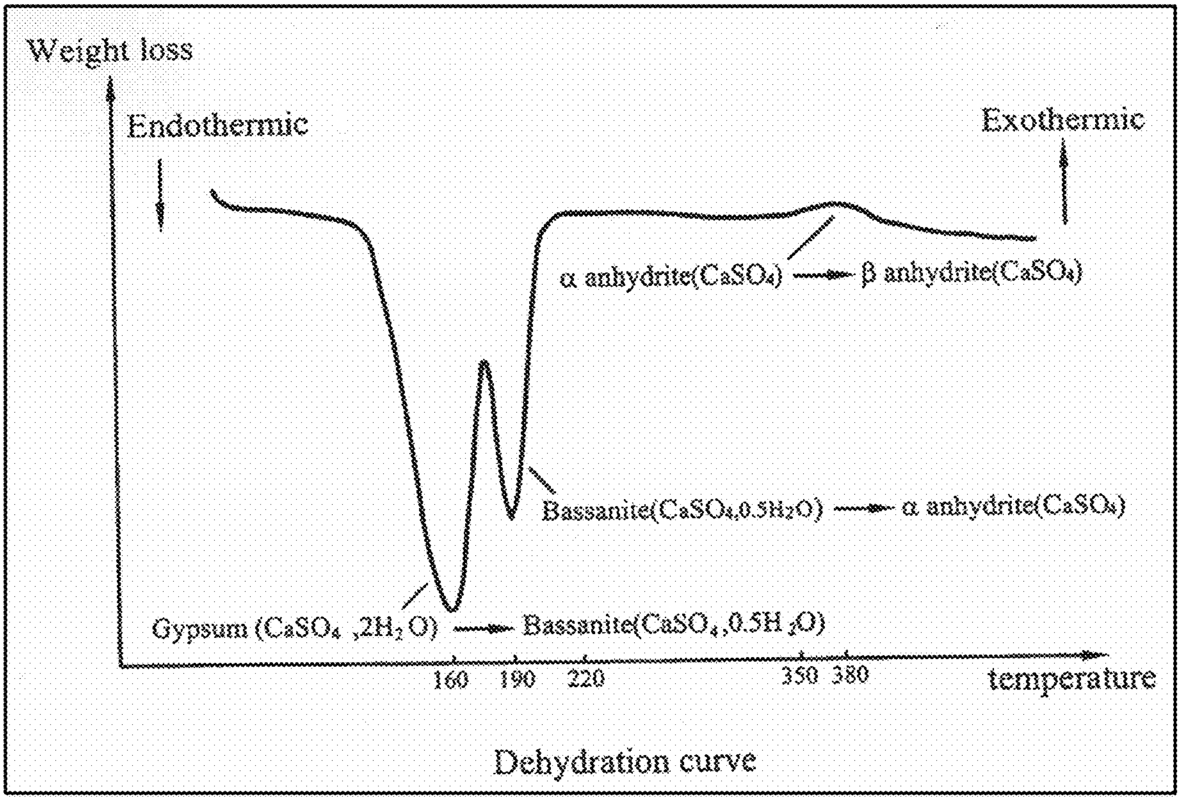
FIG. 1 is a graphical representation of a Differential Scanning calorimetry (DSC) curve of temperature (° C.) and weight loss of a conventional gypsum sample.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, the present invention is directed to a method of manufacturing gypsum board as well as the resulting gypsum board. The method comprises providing a gypsum slurry with a shrinkage-reducing additive. The shrinkage-reducing additive may include a metal halide, a metal salt of an acid, a silica, or any combination thereof. Such shrinkage-reducing additives may also be present in the final gypsum board.

The present inventors have discovered that such shrinkage-reducing additives can be employed to be present at the gypsum crystal interfaces in order to minimize the shrinkage of the resulting board. Alternatively or simultaneously, the shrinkage-reducing additives can cause a defect in the gypsum crystal growth during the crystal growth stage at high temperatures. Nevertheless, without intending to be limited by theory, the present inventors have discovered a manner in which a gypsum board can have a lower shrinkage when exposed to high temperatures.

As determined herein, the shrinkage can be measured via thermal mechanical analyzer (TMA). The test is conducted using the E119 ramp rates with a sample size of 5 mm by 5 mm by 11 mm (11 mm thickness). Using TMA, a change in dimension, in particular thickness can be determined and as measured herein, the shrinkage and thickness is based on the values at 950° C. Without the shrinkage-reducing additive as disclosed herein, a gypsum board (i.e., one containing gypsum, the shrinkage-reducing additive, and other additives) may have an average shrinkage of greater than 20%. However, by employing a shrinkage-reducing additive as disclosed herein, the gypsum board may exhibit a shrinkage of 20% or less, such as 16% or less, such as 15% or less, such as 14% or less, such as 12% or less, such as 10% or less, such as 8% or less, such as 6% or less, such as 5% or less. The gypsum board may have an average shrinkage of greater than 0%, such as 0.5% or more, such as 1% or more, such as 2% or more, such as 3% or more, such as 5% or more, such as 10% or more. Such percentages are based on the initial thickness.

As another means for determining the effect of the shrinkage-reducing additive on gypsum, the shrinkage can be measured by determining an area shrinkage (i.e., of a face instead of a thickness). For such area shrinkage, it can be determined utilizing a cast gypsum bar (i.e., one containing only gypsum and the shrinkage-reducing additive) having dimensions of 1"×1"×11.25" (face or back of 1"×11.25" and a thickness of 1"), drying the bar at 45° C. until a constant mass is obtained, and conditioning the bar at 70° F. and 50% RH for 12 hours. After conditioning, the bars are placed into a muffle furnace and quickly ramped according to ramp rates as defined in ASTM E119 to a temperature of about 950° C. The percentage change in shrinkage is determined by comparing the area after heating with the initial 1"×11.25" area.

In this regard, as illustrated in Table 2 and 3 of the examples, a conventional gypsum bar not containing a shrinkage-reducing additive as disclosed herein or any other additives may have an area shrinkage of 14-17%. Meanwhile, shrinkage-reducing additives may be employed to provide a reduction in the amount of shrinkage. For instance, such shrinkage-reducing additives may provide a gypsum board or bar that exhibits an area shrinkage of 20% or less, such as 17% or less, such as 15% or less, such as 14% or less, such as 13% or less, such as 12% or less, such as 10% or less, such as 8% or less, such as 6% or less, such as 4% or less, such as 3% or less. The area shrinkage may be 1% or more, such as 2% or more, such as 3% or more, such as 5% or more, such as 7% or more, such as 9% or more. Such percentages are based on the initial area.

The gypsum board may be produced according to any method generally known in the art. In this regard, the general method of making a gypsum board may not necessarily be limited by the present invention.

In general, the gypsum board includes a gypsum core that is produced from a gypsum slurry that is prepared as a mixture of dry and wet ingredients. The dry ingredients include primarily calcium sulfate hemihydrate and may include one or more additives that are known in the art, such as fiberglass, set accelerators, fillers (e.g., vermiculite), crystal modifiers (e.g., boric acid) and/or binders (e.g., starch).

The wet ingredients may include water and may include one or more additional components that are known in the art, such as paper pulp, potash, dispersants, set retarders, polymers, wax emulsion, silicone or siloxanes, surfactants, and thickening agents. Additional "gauging water" may be added to the gypsum slurry to achieve the desired flowability of the slurry. The dry ingredients, pulp paper solution and gauging water may comprise the basic chemical components of the gypsum core. In addition, it should be understood that the water to stucco (i.e., calcined gypsum) ratio is not necessarily limited. For instance, while it may be greater than 1 in one embodiment, in another embodiment, it may be 1 or less, such as 0.9 or less.

The dry ingredients are typically mixed in a high speed mixing apparatus. The premix of dry ingredients, the wet ingredients and any gauging water are combined in a mixer (e.g., a pin mixer) to form the gypsum slurry. The gypsum slurry is commonly output from the mixer to a canister and then discharged through an outlet chute or "boot".

An aqueous foam may also be added to the gypsum slurry, to enhance the fluidity of the slurry and control the core density and weight of the gypsum board. The foam may comprise a mixture of foam water, a foaming agent (e.g., soap) and air, and can be pre-generated using various mechanical foam generation devices that are known in the art. The foam may be added to the gypsum slurry in the mixer or in the canister where additional mixing may occur.

Thereafter, a boot deposits and spreads the gypsum slurry onto a moving, continuous sheet of bottom (back) facing material. A moving, continuous sheet of top (face) facing material is placed on the gypsum slurry, to sandwich the slurry between the top and bottom facing materials and form the board. The board passes through a forming station which shapes the board into the desired thickness and width. Although the facing material is described as paper, other materials known in the art may be used as a facing material, such as fiberglass mat.

The board travels along a belt line for several minutes, during which time the stucco and water rapidly undergo a rehydration reaction and the board stiffens and sets into a solid form. In the rehydration reaction, the calcium sulfate hemihydrate is hydrated to form crystals of calcium sulfate dihydrate, according to the following equation:

$$CaSO_4{\cdot}0.5H_2O+1.5H_2O \rightarrow CaSO_4{\cdot}2H_2O+heat$$

The boards are then cut into a desired length and dried in a continuous kiln to evaporate excess (free) water, while the chemically bound water is retained in the newly formed gypsum crystals. In this regard, the gypsum board now contains an interlocking matrix of gypsum that is formed from stucco, water, and various other additives In general, the fire resistance of gypsum board is derived from the loss of crystalline water present in the gypsum molecular structure. Gypsum contains two moles of crystalline water in its molecular structure, or approximately 21% water by weight, depending on purity. When exposed to high temperatures, gypsum goes through two principal dehydration reactions. In the first reaction, gypsum undergoes a dehydration reaction to form calcium sulfate hemihydrate.

(Reaction 1)

$$CaSO_4{\bullet}2H_2O + Heat \rightarrow CaSO_4{\bullet}0.5H_2O + 1.5H_2O$$

(Gypsum) (Hemihydrate (bassanite))

In the second reaction, the calcium sulfate hemihydrate is further dehydrated and converted to the soluble form of calcium sulfate anhydrite.

(Reaction 2)

$$CaSO_4{\bullet}0.5H_2O + Heat \rightarrow CaSO_4\ (AIII) + 0.5H_2O$$

(Hemihydrate (bassanite)) (Soluble Anhydrite)

The dehydration reactions are endothermic reactions that absorb energy from the surroundings, usually in the form of heat. The endothermic reactions hold the gypsum board at a constant temperature until fully dehydrated, which slows the temperature rise of the gypsum during exposure to fire. The release of water in these dehydration reactions further delays the progress of fire.

Once the dehydration is completed, the temperature of the gypsum board increases and the calcium sulfate anhydrite transforms from the soluble form to the insoluble form (AII).

This transformation is accompanied by a transition from a rhombohedral to an orthorhombic crystalline structure, which results in a denser mass and a dimensional contraction (shrinkage) of the gypsum board.

Figure 2:
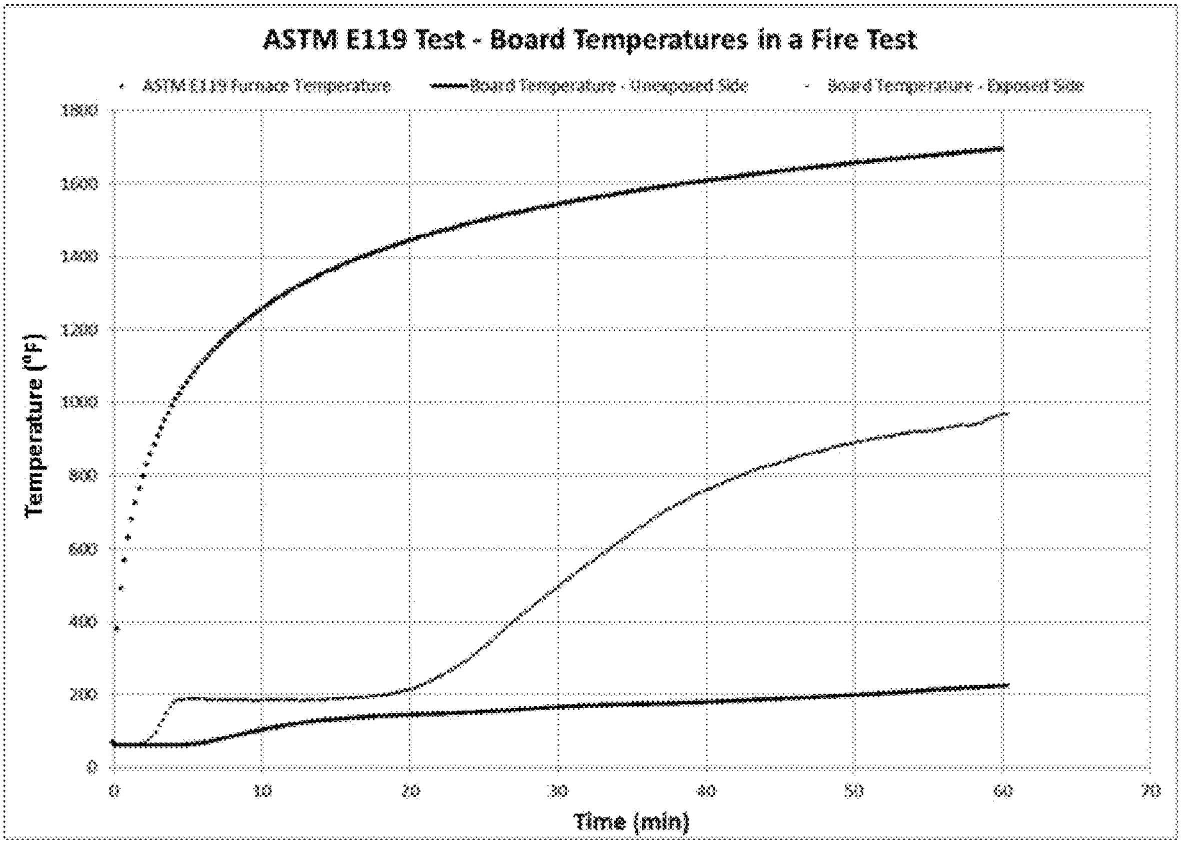
FIG. 2 is a data plot of a typical E119 test measuring time and temperature of a conventional gypsum board.
Figure 3:
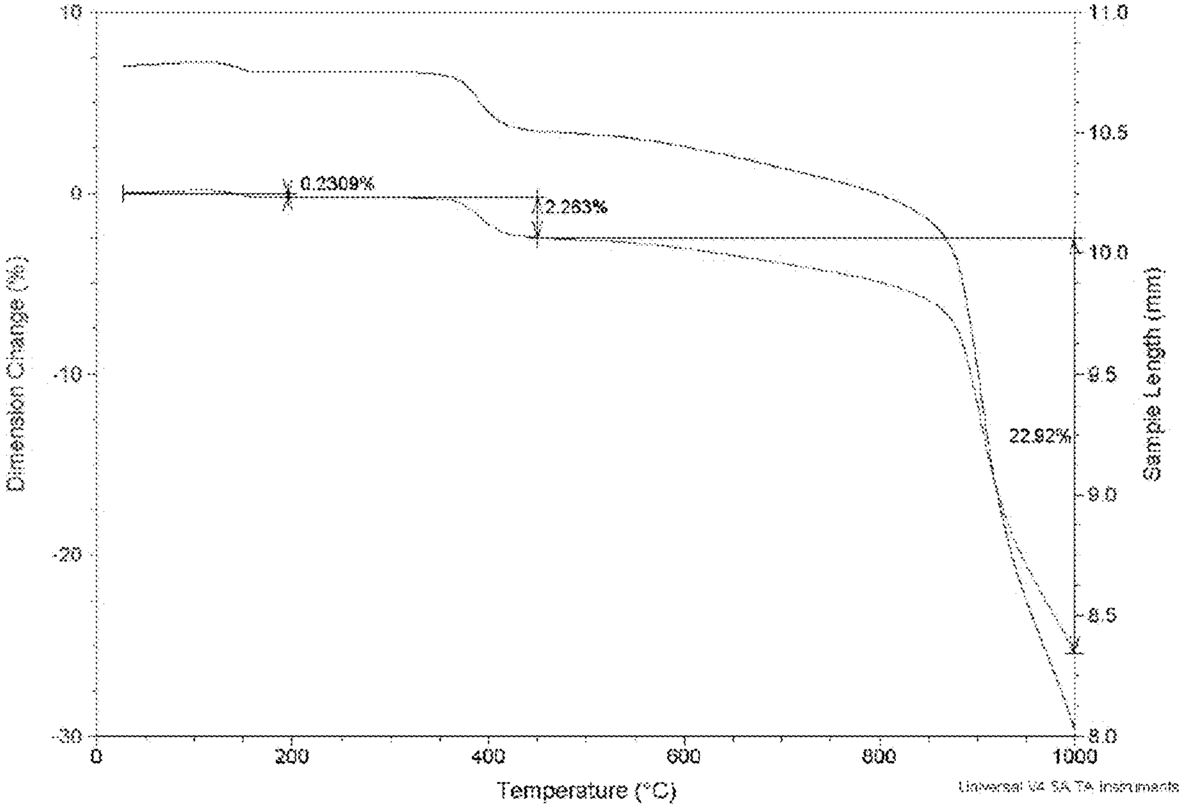
FIG. 3 is a Thermal Mechanical Analyzer (TMA) plot of a length dimension, percent change in dimension and temperature of a conventional gypsum sample.
Figure 4:
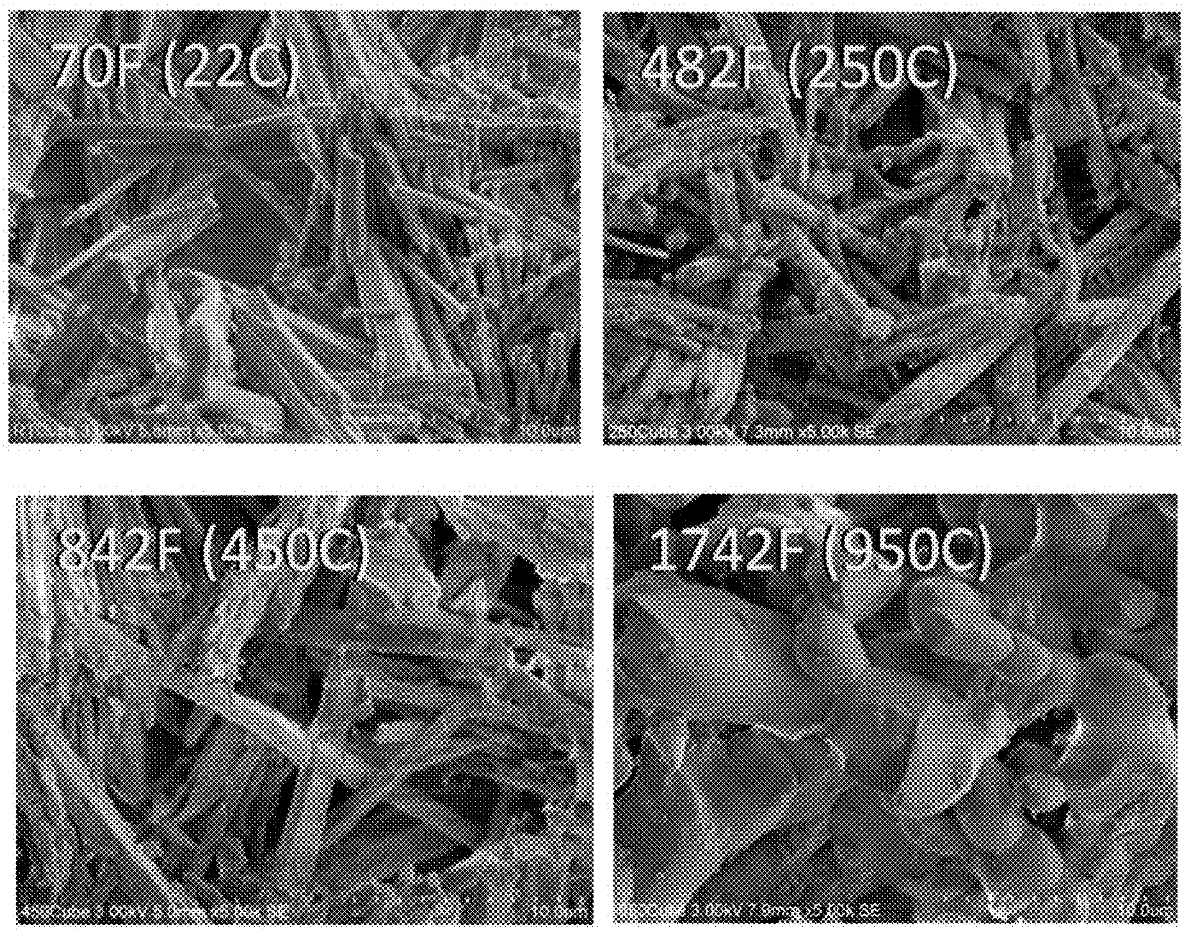
FIG. 4 is a comparison of Scanning Electron Microscope (SEM) images of gypsum crystal morphology when exposed to different temperatures.

As discussed in Examples 1-4 below, FIGS. 1-3 provide information regarding the weight loss of a conventional gypsum sample as illustrated using DSC (FIG. 1), the time/temperature test in accordance with ASTM E119 (FIG. 2), and the change in dimension (i.e., thickness) as a function of temperature as determined according to TMA (FIG. 3). Meanwhile, FIG. 4 provides SEM images of gypsum crystal at various temperatures. These images show the transformation of gypsum crystals in a conventional gypsum boards a function of temperature. For instance, at 250° C., the gypsum crystals maintain their initial shape and size; however, the structure becomes more porous with increasing numbers of fissures and cracks typical of dehydration. At 450° C., the gypsum crystals maintain the needle-like shape and size, similar to the structure shown at 250° C.; however, the number of observed fissures and cracks is further increased. At 950° C., the gypsum crystals lose their needle-like morphology and transform into a smooth, dense surface. This morphology change is attributed to the sintering phenomenon.

The present inventors have discovered that by employing the shrinkage-reducing additives disclosed herein, such sintering phenomenon may be minimized. For instance, such shrinkage-reducing additives can be incorporated in order to minimize the extent to which the gypsum crystals are sintered. In addition, the inclusion of such shrinkage-reducing additive can allow for the formation of a defect in the crystal growth. As a result, the gypsum crystals are able to maintain their integrity for a longer period of time at higher temperatures without resulting in excessive shrinkage which in turn would result in failure of the board at such high temperatures and when tested in accordance with ASTM E119. Thus by minimizing the shrinkage, the gypsum board can have improved fire resistance as well as improved mechanical integrity and strength.

As a result, the specific surface area of the gypsum at a temperature of 950° C. may be about 40% or more, such as about 50% or more, such as about 70% or more, such as about 80% or more, such as about 90% more, such as about 100% or more, such as about 125% or more, such as about 150% or more, such as about 200% more the specific surface area of the gypsum at a temperature of 22° C. Without such shrinkage-reducing additive, the specific surface area of the gypsum at a temperature of 950° C. may be less than 40% of the specific surface area of the gypsum at a temperature of 22° C.

In order to provide the desired effect, the shrinkage-reducing additive may have a particular size. For instance, the shrinkage-reducing additive may have a particle size of 200 micrometers or less, such as 150 micrometers or less, such as 100 micrometers or less, such as 75 micrometers or less, such as 50 micrometers or less, such as 40 micrometers or less, such as 25 micrometers or less, such as 15 micrometers or less, such as 10 micrometers or less, such as 5 micrometers or less, such as 1 micrometer or less, such as about 900 nanometers or less, such as about 800 nanometers or less, such as about 600 nanometers or less, such as about 500 nanometers or less, such as about 300 nanometers or less, such as about 200 nanometers or less, such as about 100 nanometers or less, such as about 50 nanometers or less. The shrinkage-reducing additives may have a particle size of 5 nanometers or more, such as 10 nanometers or more, such as 20 nanometers or more, such as 30 nanometers or more, such as 40 nanometers or more, such as 50 nanometers or more, such as 100 nanometers or more, such as 250 nanometers or more, such as 500 nanometers or more, such as 750 nanometers or more, such as 1 micrometer or more, such as 5 micrometers or more, such as 10 micrometers or more, such as 20 micrometers or more, such as 50 micrometers or more, such as 100 micrometers or more. In one embodiment, such particle size may be an average particle size of the shrinkage-reducing additive.

In one embodiment, in order to provide a shrinkage-reducing additive at the gypsum crystal interface, the shrinkage-reducing additive may have a particular size. In this regard, the shrinkage-reducing additive may be one having a particle size of less than 1 micrometer, such as about 900 nanometers or less, such as about 800 nanometers or less, such as about 600 nanometers or less, such as about 500 nanometers or less, such as about 300 nanometers or less, such as about 200 nanometers or less, such as about 100 nanometers or less, such as about 50 nanometers or less. The shrinkage-reducing additives may have a particle size of 5 nanometers or more, such as 10 nanometers or more, such as about 20 nanometers or more, such as about 30 nanometers or more, such as about 40 nanometers or more, such as about 50 nanometers or more, such as about 100 nanometers or more, such as about 250 nanometers or more. In one embodiment, such particle size may be an average particle size of the shrinkage-reducing additive.

As indicated herein, a shrinkage-reducing additive is employed in the gypsum board. The shrinkage-reducing additive may include a metal salt of an acid, a silica, or any combination thereof. In one embodiment, the shrinkage-reducing additive may include a metal salt of an acid. In another embodiment, the shrinkage-reducing additive may include a silica.

In one embodiment, the shrinkage-reducing additive may include a metal salt of an acid, such as an organic acid. For instance, the salt may be a sulfate, a carbonate, a phosphate, or a mixture thereof. In one embodiment, the salt may be a sulfate. In another embodiment, the salt may be a carbonate. In another embodiment, the sale may be a phosphate.

In addition, the metal may be an alkaline earth metal or a transition metal. In one embodiment, the metal may be an alkaline earth metal. In another embodiment, the metal may be a transition metal. For instance, the metal may include, but is not limited to, strontium, barium, iron, copper, nickel, titanium, zirconium, manganese, cobalt, silver, aluminum, etc. In one embodiment, the metal may include barium, iron, or a mixture thereof. In one particular embodiment, the metal may include barium. In another particular embodiment, the metal may include iron.

In one embodiment, the shrinkage-reducing additive may be a metal sulfate. In particular, the shrinkage-reducing additive may include barium sulfate, iron sulfate, or a mixture thereof. In one particular embodiment, the shrinkage-reducing additive may include barium sulfate. In another particular embodiment, the shrinkage-reducing additive may include iron sulfate. In one embodiment, the shrinkage-reducing additive does not include calcium sulfate.

In one embodiment, the shrinkage-reducing additive may be a metal carbonate. In particular, the shrinkage-reducing additive may include barium carbonate, iron carbonate, or a mixture thereof. In one particular embodiment, the shrinkage-reducing additive may include barium carbonate. In another particular embodiment, the shrinkage-reducing additive may include iron carbonate.

In one embodiment, the shrinkage-reducing additive may be a metal phosphate. In particular, the shrinkage-reducing additive may include barium phosphate, iron phosphate, or a mixture thereof. In one particular embodiment, the shrinkage-reducing additive may include barium phosphate. In another particular embodiment, the shrinkage-reducing additive may include iron phosphate.

In one embodiment, the shrinkage-reducing additive may be formed from a precursor shrinkage-reducing additive. For instance, the precursor shrinkage-reducing additive may be provided to the slurry and undergo a reaction to form the shrinkage-reducing additive. In one embodiment, the precursor shrinkage-reducing additive may include a metal halide. For instance, the metal of the metal halide may be any of the aforementioned metals referenced above. The halide may generally be any halide. The halide may be any halide, such as fluoride, chloride, bromide, iodide, or a mixture thereof. However, in one embodiment, the halide may be a chloride.

In one embodiment, when the shrinkage-reducing additive is a metal sulfate, such sulfate may be provided in the gypsum board via the precursor shrinkage-reducing additive. Such precursor shrinkage-reducing additive may be a metal halide wherein the metal of the metal halide is the same as the metal of the metal sulfate. In this regard, the metal halide may be provided to the slurry and via the existing sulfate (e.g., calcium sulfate) present within the slurry, a reaction may occur between the metal halide and the calcium sulfate to yield the metal sulfate shrinkage-reducing additive. For instance, a barium chloride precursor shrinkage-reducing additive may be employed to react with the calcium sulfate present in the slurry to yield barium sulfate. As another example, an iron chloride precursor shrinkage-reducing additive may be employed to react with the calcium sulfate present in the slurry to yield an iron sulfate.

The present inventors have discovered that such method allows for the synthesis of a precipitated metal sulfate. Such reaction allows for the synthesis of precipitated metal sulfate having a much smaller particle size than conventional and readily available metal sulfates, which have particle sizes in the micrometer-scale range. In addition, conversion of such conventional and readily available metal sulfates to such a nanometer-scale as required may not be practical. In this regard, the present inventors have discovered that providing a shrinkage-reducing additive via the aforementioned means can allow for even a further reduction in the amount of shrinkage.

In one embodiment, the shrinkage-reducing additive may be a silica. The silica may be a colloidal silica, a precipitated silica, or a mixture thereof. In one embodiment, the silica may be a colloidal silica. In another embodiment, the silica may be a precipitated silica. Without intending to be limited by theory, the silica may be chemically inert unlike the formation of the aforementioned metal salts of the acids which may be formed via an in situ reaction by the incorporation of a precursor shrinkage-reducing additive, such as a metal halide.

In one embodiment, the shrinkage-reducing additive may be colloidal silica. As generally known in the art, colloidal silica may be a suspension of fine, amorphous, generally spherical silica particles. Generally, colloidal silica may also be nonporous. Generally, the silica particles in the colloidal silica may be monodisperse with respect to particle size. For instance, the deviation in particle size may be 10% or less, such as 5% or less, such as 3% or less, such as 2% or less, such as 1% or less. In one embodiment, the colloidal silica may have a pH of 7 or more. The colloidal silica may have a solids content of 75% or less, such as 60% or less, such as 50% or less, such as 45% or less, such as 35% or less, such as 30% or less and 5% or more, such as 10% or more, such as 20% or more, such as 30% or more, such as 40% or more.

In one embodiment, the shrinkage-reducing additive may be precipitated silica. As generally known in the art, precipitated silica is produced by precipitation from a solution containing silicate salts. Generally, precipitated silica may be porous and may be present as an agglomerate. The precipitated silica may have a D50 of 500 nanometers or more, such as 1 micrometer or more, such as 2 micrometers or more, such as 3 micrometers or more, such as 5 micrometers or more, such as 10 micrometers or more, such as 15 micrometers or more, such as 25 micrometers or more to 100 micrometers or less, such as 75 micrometers or less, such as 50 micrometers or less, such as 40 micrometers or less, such as 25 micrometers or less, such as 20 micrometers or less, such as 15 micrometers or less, such as 10 micrometers or less, such as 5 micrometers or less, such as 4 micrometers or less, such as 1 micrometer or less. Such aforementioned D50, in one embodiment, may refer to the agglomerate size of the precipitated silica.

In addition to the above, the shrinkage-reducing additive may be one that does not burn at a temperature of 400° C. or more, such as about 500° C. or more, such as about 700° C. or more, such as about 900° C. or more.

The shrinkage-reducing additives may be present in an amount of about 20 wt. % or less, such as about 15 wt. % or less, such as about 10 wt. % or less, such as about 8 wt. % or less, such as about 5 wt. % or less, such as about 4 wt. % or less, such as about 3 wt. % or less, such as about 2 wt. % or less, such as about 1 wt. % or less, based on the weight of the stucco (i.e., calcined gypsum). The shrinkage-reducing additives may be present in an amount of about 0.05 wt. % or more, such as about 0.1 wt. % or more, such as about 0.25 wt. % or more, such as about 0.5 wt. % or more, such as about 0.75 wt. % or more, such as about 1 wt. % or more, such as about 2 wt. % or more, such as about 4 wt. % or more, such as about 5 wt. % or more, based on the weight of the stucco (i.e., calcined gypsum). In one embodiment, the shrinkage-reducing additive may be present in a final gypsum board in the aforementioned amounts wherein the amount is based on the amount of gypsum in the board.

It should be understood that such shrinkage-reducing additives may be used alone or in any combination. For instance, combinations may be effective at providing a synergistic effect to reduce the shrinkage.

In addition, it should be understood that the point of the process in which the shrinkage-reducing additives are incorporated is not necessarily limited. That is, the shrinkage-reducing additives may be incorporated into a gypsum slurry at various steps in the manufacturing process. In addition, where multiple shrinkage-reducing additives are employed, such shrinkage-reducing additives may be added to the gypsum slurry at the same or at different steps of the manufacturing process. However, in one preferred embodiment, the shrinkage-reducing additives are added to the gypsum slurry by mixing with the dry ingredients. For instance, such shrinkage-reducing additives may be provided in a mixer of the manufacturing process. Alternatively, the shrinkage-reducing additives may be added in the mill.

The gypsum board produced according to the method disclosed herein may have any combination of physical and/or mechanical properties as desired for the particular application. In this regard, the gypsum board disclosed herein is not necessarily limited by weight, density, or other mechanical properties (e.g., nail pull strength, flexural strength, core hardness, humidified bond load, etc.).

The board may have any weight as generally employed in the art. For instance, the board may have a weight of about 2500 lbs/MSF (lbs per one thousand square feet) or less, such as about 2400 lbs/MSF or less, such as about 2200 lbs/MSF or less, such as about 2000 lbs/MSF or less, such as about 1800 lbs/MSF or less, such as about 1500 lbs/MSF or less, such as about 1300 lbs/MSF or less. The board may have a weight of about 1000 lbs/MSF or more, such as about 1200 lbs/MSF or more, such as about 1400 lbs/MSF or more, such as about 1600 lbs/MSF or more, such as about 1800 lbs/MSF or more, such as about 2000 lbs/MSF or more. By about, the weight may vary by +/−5%, such as +/−3%, such as +/−2%, such as +/−1%.

The board may be any thickness as generally employed in the art. For instance, in one embodiment, the board may have a thickness of about ¼". In another embodiment, the board may have a thickness of about ⅜". In another embodiment, the board may have a thickness of about ½". In a further embodiment, the board may have a thickness of about ⅝". By about, the thickness may vary by +/−5%, such as +/−3%, such as +/−2%, such as +/−1%.

In one embodiment, the hardness (as determined in accordance with ASTM C473), may be about 9 $lb_f$ or more, such as about 10 $lb_f$ or more, such as about 11 $lb_f$ or more, such as 12 $lb_f$ or more, such as 13 $lb_f$ or more. The hardness may be about 50 $lb_f$ or less, such as about 40 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less. The aforementioned hardness describes the core hardness, the end hardness, or both. In one embodiment, the aforementioned hardness describes the core hardness.

In one embodiment, the nail pull strength (as determined in accordance with C473), may be about 70 $lb_f$ or more, such as about 75 $lb_f$ or more, such as about 77 $lb_f$ or more, such as about 80 $lb_f$ or more, such as about 85 $lb_f$ or more, such as about 90 $lb_f$ or more, such as about 100 $lb_f$ or more. The nail pull strength may be about 120 $lb_f$ or less, such as about 110 $lb_f$ or less, such as about 100 $lb_f$ or less, such as about 90 $lb_f$ or less, such as about 80 $lb_f$ or less.

In one embodiment, the flexural strength in the perpendicular direction (as determined in accordance with ASTM C473) may be about 90 $lb_f$ or more, such as about 100 $lb_f$ or more, such as about 110 $lb_f$ or more, such as about 130 $lb_f$ or more, such as about 150 $lb_f$ or more, such as about 160 $lb_f$ or more, such as about 175 $lb_f$ or more. The flexural strength in the perpendicular direction may be about 250 $lb_f$ or less, such as about 225 $lb_f$ or less, such as about 200 $lb_f$ or less, such as about 180 $lb_f$ or less, such as about 175 $lb_f$ or less, such as about 150 $lb_f$ or less, such as about 125 $lb_f$ or less.

In one embodiment, the flexural strength in the parallel direction (as determined in accordance with ASTM C473) may be about 20 $lb_f$ or more, such as about 25 $lb_f$ or more, such as about 30 $lb_f$ or more, such as about 40 $lb_f$ or more, such as about 50 $lb_f$ or more, such as about 60 $lb_f$ or more. The flexural strength in the parallel direction may be about 80 $lb_f$ or less, such as about 70 $lb_f$ or less, such as about 60 $lb_f$ or less, such as about 50 $lb_f$ or less, such as about 40 $lb_f$ or less.

In addition, the gypsum board may be manufactured so as to pass the necessary UL tests for fire-resistance. For instance, the gypsum board may pass ASTM E119, which is the standard test method for a fire test of a building construction and materials.

EXAMPLES

Example 1

Dehydration of a Conventional Gypsum Board

The dehydration of a conventional gypsum board was tested by thermogravimetric analysis and differential scanning calorimetry, as shown in FIG. 1. The energy required for complete dehydration of gypsum is about 625 kJ/kg, which is consumed in the separation and evaporation of the water molecules from the gypsum crystals. The dehydration curve shows that endothermic Reactions 1 and 2 take place between about 80° C. to 220° C., with respective peaks at about 160° C. and about 190° C. Once dehydration is complete, the temperature of the gypsum sample continues to rise. A third peak is shown between about 350° C. to 380° C., which corresponds to the exothermic transformation from soluble α anhydrite (AIII) to insoluble β anhydrite (AII), and the transition in the gypsum crystal structure.

Example 2

Fire Test of Conventional Gypsum Board

The industrial fire testing standard ASTM E119 provides strict requirements for testing wallboard in a controlled testing assembly to ensure that products meet certain fire resistance standards.

A conventional gypsum board was subjected to an ASTM E119 fire test. FIG. 2 shows the board temperature profiles during gypsum dehydration for both the exposed and unexposed sides of the gypsum board in the wall assembly, along with the furnace temperature ramp. The temperature of the gypsum board does not increase appreciably during the dehydration reaction, particularly on the unexposed board side. However, the temperature increase resumes when the dehydration reaction is finished, as shown by the temperature rise on the exposed side of the gypsum board.

Example 3

Thermomechanical Analysis of Conventional Gypsum Board

A conventional gypsum board was subjected to thermomechanical analysis (TMA) to determine the dimensional change with increasing temperature. The dehydration reaction and the transformation from soluble to insoluble anhydrite results in a series of shrinkages, as shown in FIG. 3. The first shrinkage starts at about 120° C. and ends at about 200° C., as a result of the gypsum crystal dehydration. The shrinkage is about −0.23% from its original thickness, depending upon gypsum purity and impurities. The second shrinkage starts at about 350° C. and is about 10 times greater than the first shrinkage (−2.3% vs. −0.23%). This shrinkage is the result of the change from soluble to insoluble anhydrite and the accompanying change from rhombohedral to orthorhombic crystal structure. The third shrinkage, and the largest one, starts at about 600° C. and shows shrinkage of about −23% at about 950° C., which is a result of the sintering process the insoluble anhydrite goes through at higher temperatures.

Example 4

A conventional gypsum board was analyzed by scanning electron microscopy (SEM) at temperatures of 22° C., 250° C., 450° C., and 950° C., as shown in FIG. 4. At 250° C., the gypsum crystals maintain their initial shape and size; however, the structure becomes more porous with increasing numbers of fissures and cracks typical of dehydration. At 450° C., the gypsum crystals maintain the needle-like shape and size, similar to the structure shown at 250° C.; however, the number of observed fissures and cracks is further increased. At 950° C., the gypsum crystals lose their needle-like morphology and transform into a smooth, dense surface. This morphology change is attributed to the sintering phenomenon. X-ray diffraction (XRD) analysis indicates an orthorhombic crystalline structure, which is typically seen in insoluble anhydrite.

This transformation is further evidenced by a comparison of the specific surface area (SSA) of the gypsum samples, as shown in Table 1 below. At 22° C., the sample has an SSA of 1.330 $m^2/g$. As the sample is heated, fissures and cracks are introduced, which increase in number and size with increased temperature. The SSA of the gypsum sample increases to 4.819 $m^2/g$ at 250° C. and to 15.595 $m^2/g$ at 450° C. At 950° C., the sintering process increases the sample density and thus reduces the surface area to 0.505 $m^2/g$.

TABLE 1

Specific Surface Area of Conventional Gypsum Based on Temperature

| Sample | Specific Surface Area ($m^2/g$) |
|---|---|
| Cube Heated to 22° C. | 1.330 |
| Cube Heated to 250° C. | 4.819 |
| Cube Heated to 450° C. | 15.595 |
| Cube Heated to 950° C. | 0.505 |

Example 5

The shrinkage performance of cast gypsum was determined. The gypsum was a cast gypsum bar having dimensions of 1"×1"×11.25" (face or back of 1"×11.25" and a thickness of 1"). The bar was dried at 45° C. until a constant mass was obtained. The bar was then conditioned at 70° F. and 50% RH for 12 hours. After conditioning, the bars were placed into a muffle furnace and quickly ramped according to ramp rates as defined in ASTM E119 to a temperature of about 950° C. All of the samples were dimensionally measured before and after heating where the initial 1"×11.25" area was compared to the post heating area.

Table 2 shows the shrinkage-reducing additives, concentration of such shrinkage-reducing additives, and the percentage of area shrinkage that occurred for these shrinkage-reducing additives.

TABLE 2

Shrinkage performance of a gypsum bar with various shrinkage-reducing additives

| Additive | | Amount (%, w/w based on stucco) | Shrinkage area (%) |
|---|---|---|---|
| None (Control) | | n/a | 14-16 |
| Barium chloride | | 0.9 | 2.9 |
| Barium carbonate | | 0.9 | 13.2 |
| Barium sulfate | | 1.0 | 16.3 |
| Aluminum phosphate | | 1.9 | 6.6 |
| Iron chloride | | 1.0 | 6.3 |
| Iron sulfate | | 1.0 | 14.7 |
| Colloidal | 12 nm, 40% solids | 1.0 | 7.9 |

TABLE 2-continued

Shrinkage performance of a gypsum bar with various shrinkage-reducing additives

| Additive | | Amount (%, w/w based on stucco) | Shrinkage area (%) |
|---|---|---|---|
| silica | 12 nm, 25% solids | 1.0 | 4.6 |
| | 22 nm, 34% solids | 1.0 | 5.8 |
| Precipitated | D50 of 18 μm | 1.0 | 8.9 |
| silica | D50 of 4 μm | 1.0 | 8.2 |
| | D50 of 2.5 μm | 1.0 | 8.5 |

Example 6

The shrinkage performance of a gypsum board containing gypsum, a shrinkage-reducing additive, and at least one other additive was determined. The gypsum board was analyzed to determine the area shrinkage as described in Example 5 or via thermomechanical analysis to determine a dimensional (i.e., thickness) change with increasing temperature. The gypsum had a sample size of 5 mm by 5 mm by 11 mm. The sample was dried at 45° C. until a constant mass was obtained. The bar was then conditioned at 70° F. and 50% RH for 12 hours. The ramp rate was the E119 ramp rate.

Table 3 shows the shrinkage-reducing additives, concentration of such shrinkage-reducing additives, and the percentage of shrinkage that occurred for these shrinkage-reducing additives.

TABLE 3

Shrinkage performance of a gypsum board with various shrinkage-reducing additives

| Additive | Amount (%, w/w based on stucco) | Area Shrinkage (%) | Thickness Shrinkage (%) |
|---|---|---|---|
| None (Control 1) | n/a | 16.34 | — |
| None (Control 2) | n/a | — | 29 |
| Barium chloride | 0.4 | 13.89 | — |
| | 1.0 | 11.68 | — |
| | 2.0 | 7.18 | — |
| | 5.0 | 13.20 | — |
| Colloidal silica | 1.0 | — | 12 |

Figure 5:
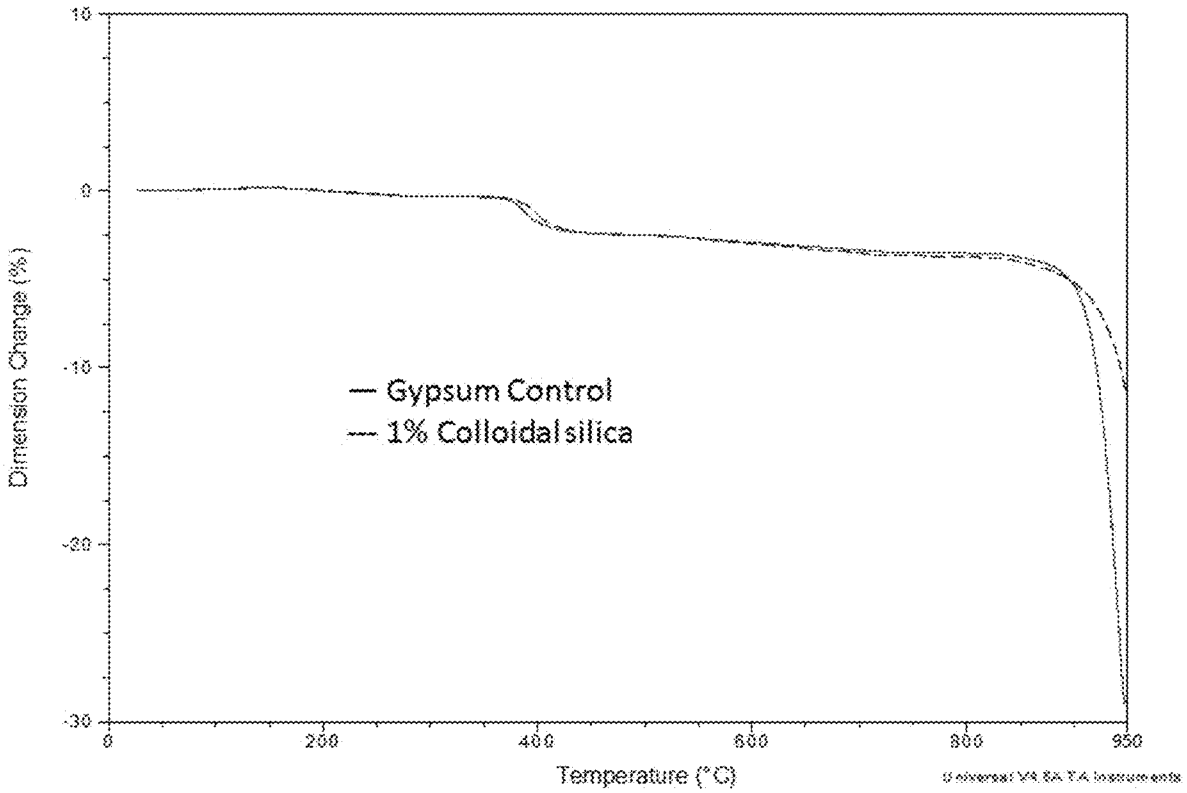
FIG. 5 is a Thermal Mechanical Analyzer (TMA) plot of the percent change in dimension and temperature of a gypsum sample and a sample with 1% colloidal silica in accordance with one aspect of the present disclosure.
Figure 6:
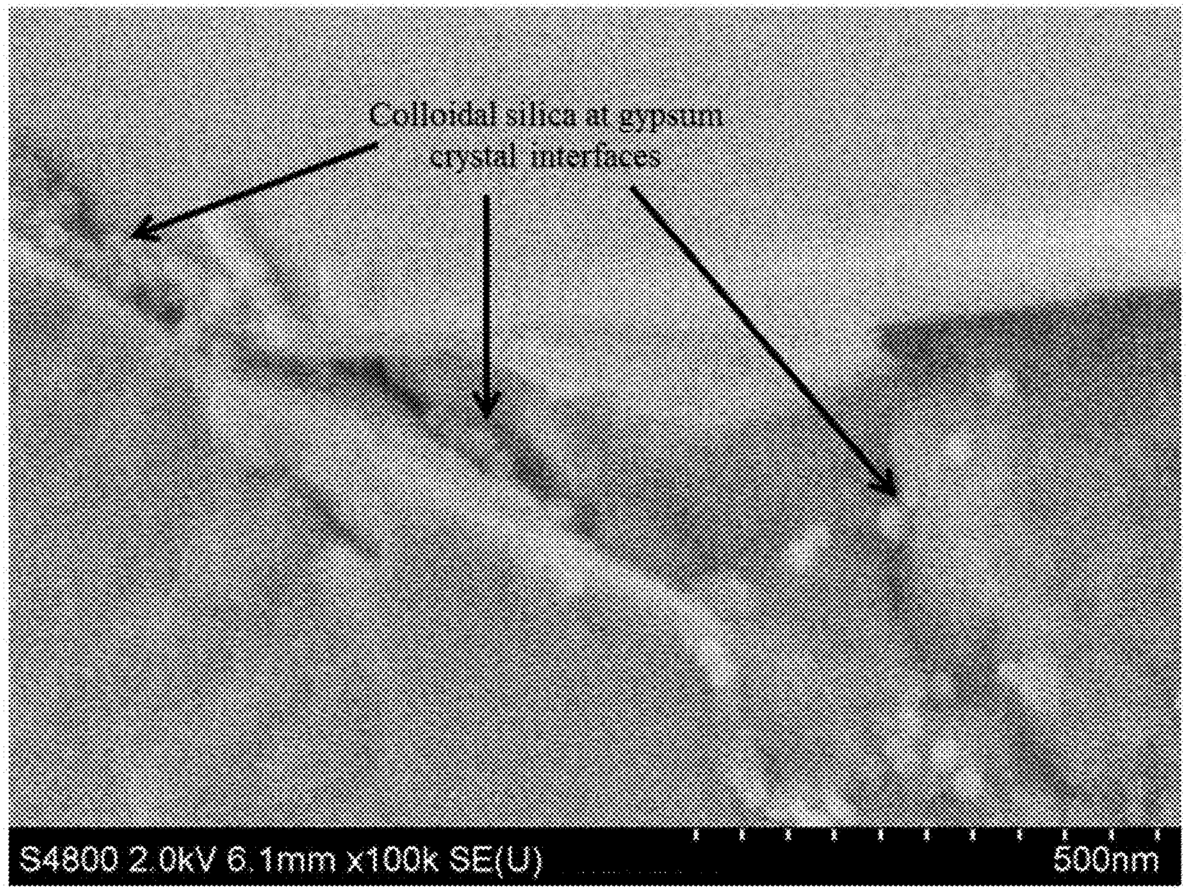
FIG. 6 is a Scanning Electron Microscope (SEM) image of gypsum crystals containing colloidal silica.

FIG. 5 includes a Thermal Mechanical Analyzer (TMA) plot of the percent change in dimension and temperature of a gypsum sample and a sample with 1% colloidal silica. As can be observed, a significant dimensional change for the gypsum control occurs before 950° C. Meanwhile, with the colloidal silica, such change is shifted to a higher temperature. Furthermore, FIG. 6 provides an SEM image of the gypsum crystals containing colloidal silica.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for manufacturing a gypsum board, the method comprising:

providing a gypsum slurry comprising a first shrinkage-reducing additive, stucco, and water, the first shrinkage-reducing additive comprising barium chloride, the first shrinkage-reducing additive being present in an amount from about 0.05 wt. % to about 4 wt. % based on the weight of the stucco used to form the gypsum slurry; and providing a top facing material on the gypsum slurry;

wherein the gypsum board exhibits an area shrinkage of less than 20%;

wherein the method further comprises a step of providing a second shrinkage-reducing additive, the second shrinkage-reducing additive comprising iron chloride, the second shrinkage-reducing additive being present in an amount from about 0.05 wt. % to about 4 wt. % based on the weight of the stucco used to form the gypsum slurry, the second shrinkage-reducing additive being present between the bottom facing material and the top facing material.

2. The method according to claim 1, wherein the gypsum board exhibits an area shrinkage of less than 10%.

3. The method according to claim 1, wherein the gypsum board exhibits an area shrinkage of less than 6%.

4. A gypsum board comprising:

a gypsum core, the gypsum core comprising gypsum, the gypsum core having been formed from a gypsum slurry comprising stucco, water, and a shrinkage-reducing additive, the shrinkage-reducing additive comprising barium chloride, the shrinkage-reducing additive being present in an amount from about 0.05 wt. % to about 4 wt. % based on the weight of the gypsum;

a bottom facing material; and a top facing material;

wherein the gypsum board exhibits an area shrinkage of less than 20%;

wherein the specific surface area of the gypsum at a temperature of 950° C. is about 40% or more than the specific surface area of the gypsum at a temperature of 22° C.

5. The gypsum board according to claim 4, wherein the gypsum slurry further comprises iron chloride.

6. The gypsum board according to claim 5, wherein the specific surface area of the gypsum at a temperature of 950° C. is about 90% or more than the specific surface area of the gypsum at a temperature of 22° C.

7. The method according to claim 1, wherein the first shrinkage-reducing additive has an average particle size of 200 micrometers or less.

8. The method according to claim 1, wherein the first shrinkage-reducing additive has an average particle size of 75 micrometers or less.

9. The method according to claim 1, wherein the first shrinkage-reducing additive is present in an amount from about 0.25 wt. % to about 2 wt. % based on the weight of the stucco used to form the gypsum slurry.

10. The method according to claim 1, wherein the second shrinkage-reducing additive is present in an amount from about 0.25 wt. % to about 2 wt. % based on the weight of the stucco used to form the gypsum slurry.

11. The gypsum board according to claim 4, wherein the shrinkage-reducing additive has an average particle size of 200 micrometers or less.

12. The gypsum board according to claim 4, wherein the shrinkage-reducing additive has an average particle size of 75 micrometers or less.

13. The gypsum board according to claim 4, wherein the shrinkage-reducing additive is present in an amount from about 0.5 wt. % to about 3 wt. % based on the weight of the stucco used to form the gypsum slurry.

14. The gypsum board according to claim 4, wherein the gypsum board further comprises iron sulfate.

15. The gypsum board according to claim 4, wherein the shrinkage-reducing additive has an average particle size of 75 micrometers or less, and the shrinkage-reducing additive is present in an amount from about 0.5 wt. % to about 3 wt. % based on the weight of the stucco used to form the gypsum slurry.

16. The gypsum board according to claim 15, wherein the gypsum board exhibits an area shrinkage of less than 10%.

17. The method according to claim 1, wherein the first shrinkage-reducing additive has an average particle size of 75 micrometers or less, and the first shrinkage-reducing additive is present in an amount from about 0.25 wt. % to about 2 wt. % based on the weight of the stucco used to form the gypsum slurry.

18. The method according to claim 17, wherein the second shrinkage-reducing additive is present in an amount from about 0.25 wt. % to about 2 wt. % based on the weight of the stucco used to form the gypsum slurry.

19. The method according to claim 18, wherein the gypsum board exhibits an area shrinkage of less than 10%.

* * * * *